United States Patent
Cho (10) Patent No.: US 7,949,842 B2
(45) Date of Patent: May 24, 2011

(54) METHOD AND APPARATUS FOR FORMATTING STORAGE MEDIUM

(75) Inventor: Chung Hee Cho, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 659 days.

(21) Appl. No.: 12/020,298

(22) Filed: Jan. 25, 2008

(65) Prior Publication Data
US 2009/0070537 A1    Mar. 12, 2009

(30) Foreign Application Priority Data
Sep. 10, 2007    (KR) .................. 10-2007-0091634

(51) Int. Cl.
*G06F 12/00*    (2006.01)
(52) U.S. Cl. ......... 711/162; 711/112; 711/156; 711/170
(58) Field of Classification Search .................. None
See application file for complete search history.

(56) References Cited

U.S. PATENT DOCUMENTS
5,086,502 A * 2/1992 Malcolm ................ 714/8
2008/0120353 A1 * 5/2008 Kwon ................ 707/204

FOREIGN PATENT DOCUMENTS
| JP | 1999-328869 A | 11/1999 |
| KR | 10-2000-0071178 A | 11/2000 |
| KR | 10-2005-0090289 A | 9/2005 |
| KR | 10-2001-1151624 A | 5/2007 |

* cited by examiner

*Primary Examiner* — Shawn X Gu
(74) *Attorney, Agent, or Firm* — Birch, Stewart, Kolasch & Birch, LLP (57) ABSTRACT

A method for formatting a storage medium. The method includes saving management information associated with data that is to be protected from the formatting, the management information indicating where the data to be protected is stored, formatting a management information area of the storage medium where the management information is stored, and recovering the saved management information to the management information area of the storage medium such that the data to be protected is accessible.

24 Claims, 12 Drawing Sheets

METHOD AND APPARATUS FOR FORMATTING STORAGE MEDIUM

This application claims the benefit of Korean Patent Application No. 10-2007-0091634, filed on Sep. 10, 2007, which is hereby incorporated by reference as if fully set forth herein.

BACKGROUND OF THE INVENTION

1. Field of the Invention

The present invention relates to a method and apparatus for formatting a storage medium.

2. Discussion of the Related Art

A variety of recording medium are now available that can store a large amount of data. Further, users can also format a storage medium to erase content stored on the storage medium. That is, the storage medium is divided into several areas, and each divided area is assigned an address or number. The formatting operation then removes the data stored in the different areas so that the user can store other information in the formatted areas. However, once the formatting operation is completed, the data can not be recovered.

SUMMARY OF THE INVENTION

Accordingly, one object of the present invention is to address the above-noted and other problems.

Another object of the present invention is to provide a method and apparatus that allows a user to selectively format particular areas of a storage medium without formatting data the user desires to protect from formatting.

To achieve these objects and other advantages and in accordance with the purpose of the invention, as embodied and broadly described herein, the present invention provides in one aspect a method for formatting a storage medium. The method includes saving management information associated with data that is to be protected from the formatting, the management information indicating where the data to be protected is stored, formatting a management information area of the storage medium where the management information is stored, and recovering the saved management information to the management information area of the storage medium such that the data to be protected is accessible.

In another aspect, the present invention provides an apparatus for formatting a storage medium. The apparatus includes a memory configured to save management information associated with data that is to be protected from the formatting, the management information indicating where the data to be protected is stored, and a controller configured to format a management information area of the storage medium where the management information is stored, and to recover the saved management information to the management information area of the storage medium such that the data to be protected is accessible.

In still another aspect, the present invention provides a system for formatting a storage medium. The system includes means for saving management information associated with data that is to be protected from the formatting, the management information indicating where the data to be protected is stored, means for formatting a management information area of the storage medium where the management information is stored, and means for recovering the saved management information to the management information area of the storage medium such that the data to be protected is accessible.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
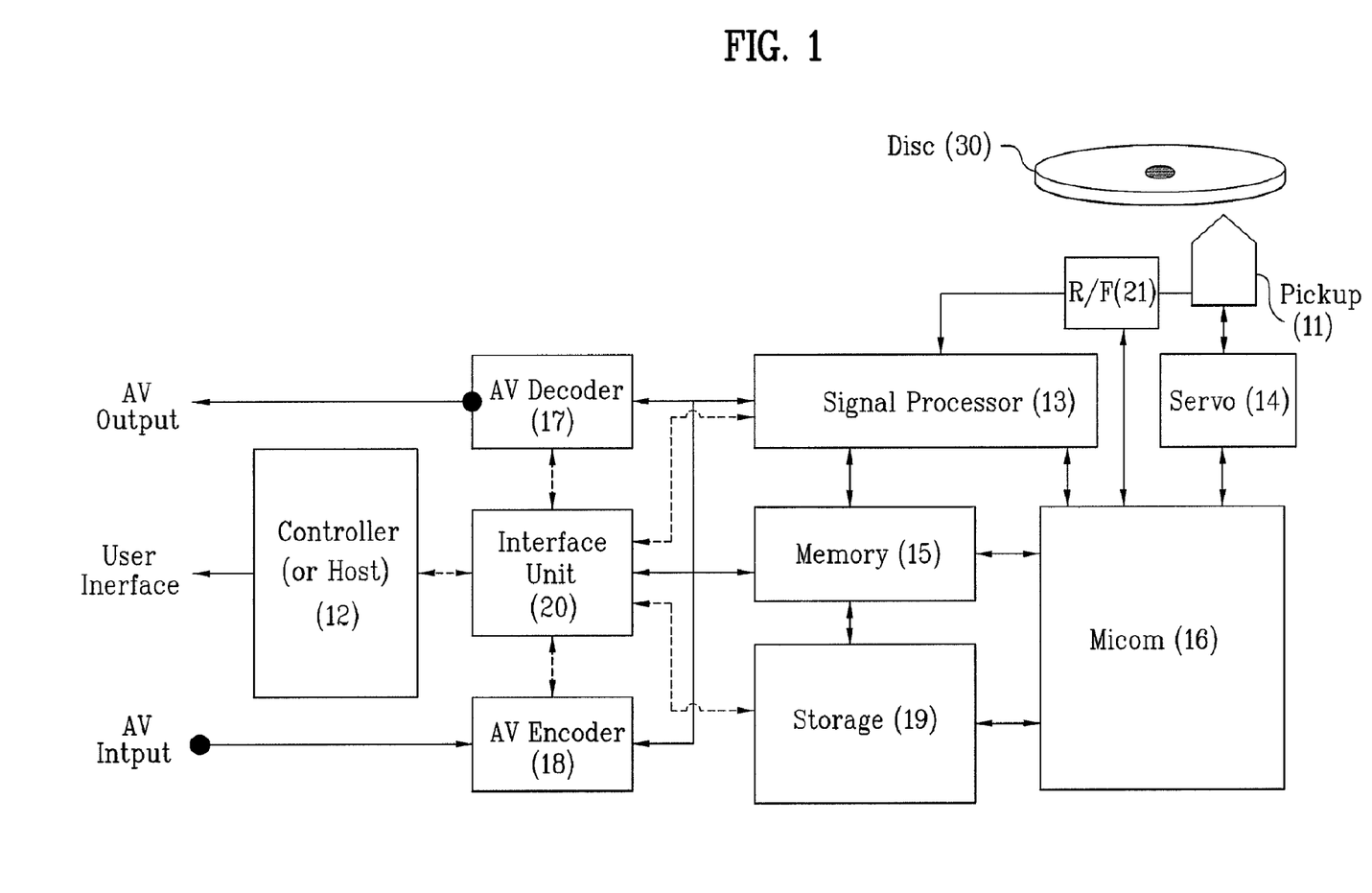
FIG. 1 is a block diagram illustrating a data recording/reproducing device according to an embodiment of the present invention.

FIG. 1 is a block diagram illustrating an apparatus for recording/reproducing data to and from a disc according to embodiment of the present invention. The data recording/reproducing device shown in FIG. 1 can record/reproduce data to and from various optical discs having different formats (e.g., DVD, BD or HD-DVD).

Further, the data recording/reproducing device records or reproduces data to and from the disc 30, receives an external input signal, performs a signal process on the received signal, and transmits the signal processed result to an external display (not shown), such that a user can view the processed signal on the display.

For example, representative external input signals may be determined to be a DMB (Digital Multimedia Broadcasting)-associated signal and an Internet-associated signal, etc. Thus, the user can connect to the Internet and download specific Internet data using the data recording/reproducing device. The data recording/reproducing device may also record the external input signal on the disc.

As shown in FIG. 1, the data recording/reproducing device includes a pickup unit 11, a servo unit 14, a signal processor 13, a memory 15, a storage unit 19 and a microprocessor (also called a microcomputer) 16. The pickup unit 11 reads data recorded on the disc 30 and management information such as a reproduction/management file information.

The servo unit 14 controls operations of the pickup unit 11, and the signal processor 13 receives the reproduction signal from the pickup unit 11, restores the received reproduction signal to a desired signal value, or modulates a signal to be recorded into another signal recorded on the optical disc. Further, the memory 15 stores a variety of information used for recording/reproducing data to and from the disc.

In addition, the microprocessor 16 controls operations of the pickup unit 11, the signal processor 13, the servo unit 14, and the memory 15. The pickup unit 11, the servo unit 14, the signal processor 13, the memory 15, the storage unit 19 and the microprocessor 16 may be generically referred to as a recording/reproducing unit.

Further, to playback data on the disc 30, the recording/reproducing unit reads data from the optical disc 30 or the storage unit 19 according to a control signal of the controller 12, and provides the decoder 17 with the read data. In other words, the recording/reproducing unit serves as a reproducing unit (also called a player or reader) for reading data from the disc.

Also, to record data on the disc 30, the recording/reproducing unit receives a signal encoded by the AV encoder 18, and records video or audio data on the disc 30, so that the recording/reproducing unit serves as a recording unit (also called a recorder).

In addition, the controller 12 (also called a host) controls overall operations of the data recording/reproducing device, interfaces with a user to control a reproduction (or playback) operation of the recording medium, and controls the downloading of data existing outside of the recording medium upon receiving a command from the user. In more detail, the controller 12 transmits a command to the recording/reproducing unit via an interface unit 20, so that the recording/reproducing unit performs a specific function corresponding to the received command.

Further, the microprocessor 16 contained in the recording/reproducing unit controls constituent elements of the recording/reproducing unit according to the above-mentioned command. In addition, the controller 12 and the microprocessor 16 may be separate components or combined into a single component. That is, the functions of the controller 12 and the microprocessor 16 may be implemented with a single control unit. Hereinafter, the controller 12 and/or the microprocessor 16 will be generically referred to as a control unit. The controller 12 may also be implemented with software (e.g., a program) and/or hardware contained in the data recording/reproducing device.

Further, the AV decoder 17 receives data from the recording medium and/or the storage unit 19, and decodes the received data into output data according to a control signal of the controller 12. The AV decoder 17 may include a plurality of decoders according to data categories.

In addition, to record a desired signal in the optical disc, the AV encoder 18 converts an input signal into a specific format signal (e.g., an MPEG2 transport stream) upon receiving a control signal from the controller 12, and transmits the converted result to the signal processor 13.

Also, the storage unit 19 is a type of memory, which is connected to or contained in the data recording/reproducing device, so that a user can store and use information or data in the storage unit 19. For example, the storage unit 19 may be a flash memory contained in the data recording/reproducing device, a USB detachably connected to the data recording/reproducing device, a hard disk drive (HDD) or a memory card.

Further, the storage unit 19 may be used as a storage medium for storing data associated with the recording medium. The data stored in the storage unit 19 while being related to the recording medium may also be downloaded from an external source. Further, the data may be directly read from the recording medium and be stored in the storage unit 19.

Figure 2:
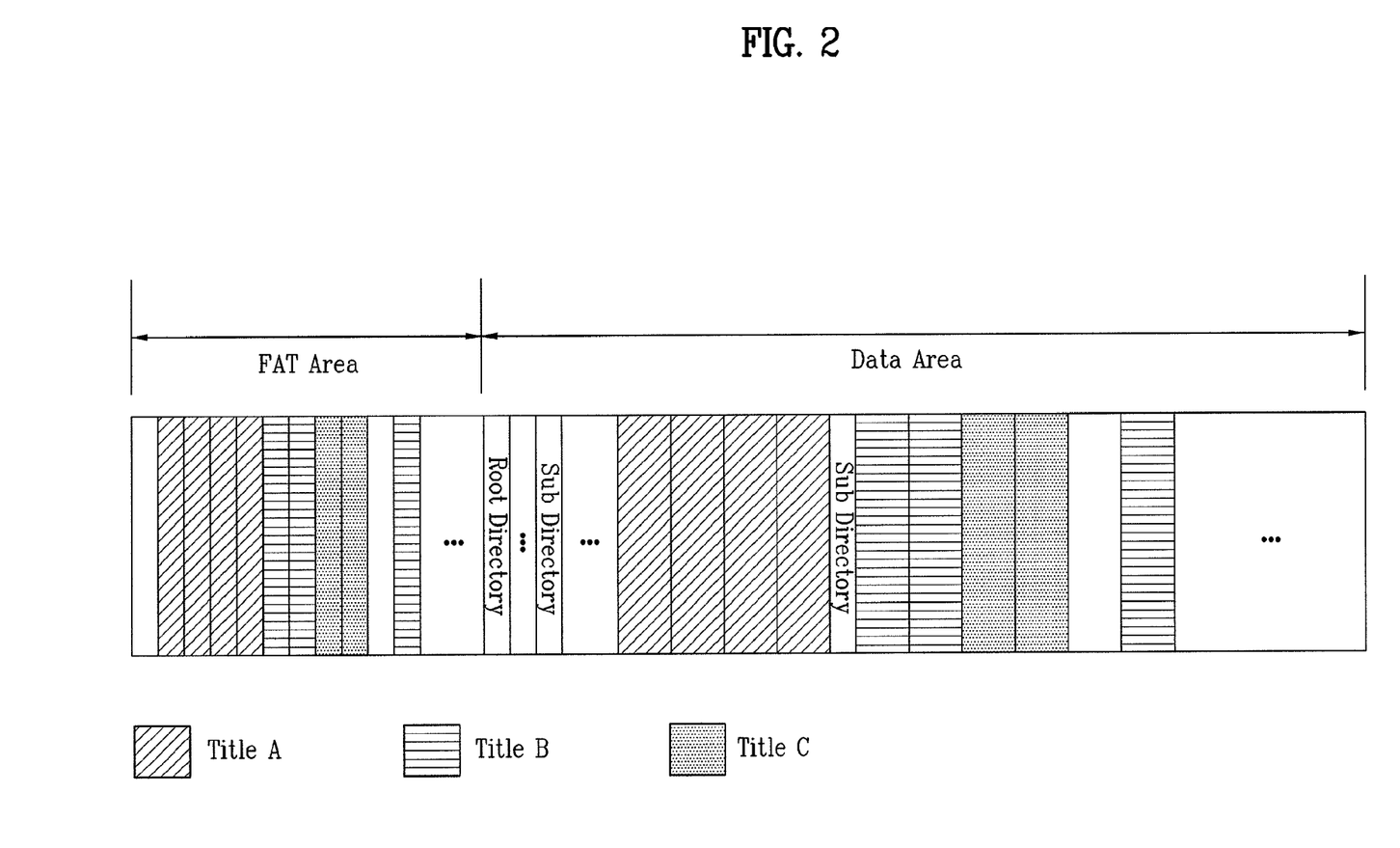
FIG. 2 is a conceptual diagram illustrating an inner area of a storage unit contained in the data recording/reproducing device shown in FIG. 1 according to an embodiment of the present invention.

Next, FIG. 2 is a conceptual diagram illustrating an area of the storage unit 19 contained in the data recording/reproducing device shown in FIG. 1 according to an embodiment of the present invention. FIG. 1 will also be referred to in the following descriptions of the embodiments of the present invention.

As shown in FIG. 2, the storage unit 19 includes a file allocation table (FAT) area and a data area. The FAT area stores a file allocation table (FAT) indicating how or where the files have been arranged in the data area. In the data area, an address is assigned to each cluster corresponding to a predetermined data size according to a particular format.

Further, a cluster is indicative of a minimum unit of a data reading/writing operation, in which the minimum unit is composed of several sectors, each of which makes the data area. In addition, the FAT area includes a variety of spaces or fields, which are connected to the clusters of the data area on a one-to-one basis. The value stored in each space or field indicates whether data has been stored in a corresponding cluster.

For example, if a title A is stored in the storage unit 19, the actual data of the title A is recorded in several clusters of the data area, and allocation information indicating how the actual data of the title A is recorded in the data area is stored in a corresponding space of the FAT.

Further, the FAT's spaces corresponding to the clusters store first information indicating whether a corresponding cluster is empty, and second information indicating whether the actual data of the title A is successively recorded in another cluster, etc. In addition, the storage unit 19 includes a root-directory entry area including a root-directory entry in which individual files arranged in a root directory and entry information of a sub-directory are described. The root-directory entry may be stored in an additional area (not shown) different from the data area shown in FIG. 2.

Also, the root-directory entry may be recorded in the next sector located after the last sector of the FAT area. Generally, the number of bytes of the single entry information is constant, and the number of entries arranged in the root directory is also fixed, so that the size of data stored in the root-directory entry is also constant.

In addition, the format scheme can be largely classified into a full format scheme and a quick format scheme. Generally, in the full format scheme, all of the areas of the storage unit 19 (or storage medium) are formatted, so that all of the data stored in the storage unit 19 is deleted from the storage unit 19. In the quick format scheme, the data area is not formatted, and only the management area including link information associated with actual files stored in the data area is formatted.

Figure 3:
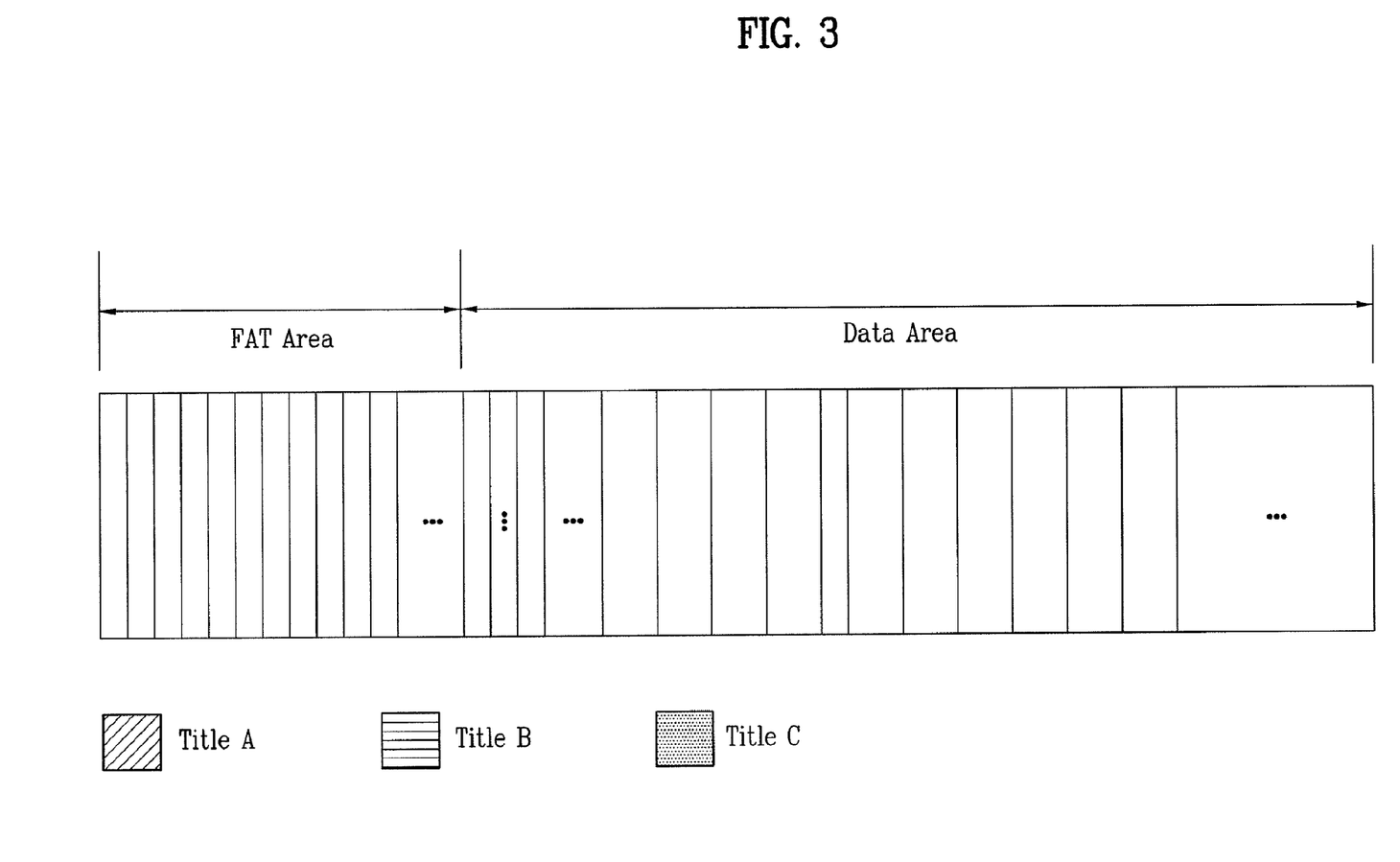
FIG. 3 is a conceptual diagram illustrating a full format process of a storage unit according to an embodiment of the present invention.

In more detail, FIG. 3 is a conceptual diagram illustrating a full format process of the storage unit 19 according to an embodiment of the present invention. As shown in FIG. 3, when the full format process is executed, all of the data is deleted from the storage unit 19. In other words, the FAT information, the root-/sub-directory entry information, and the actual files, etc. are deleted from the storage unit 19. In addition, the FAT information associated with actual data stored in the data area of the storage unit 19 is initialized.

In more detail, if the controller 12 transmits a full-format command for fully formatting the storage unit 19 to the recording/reproducing unit via the interface unit 20, the microprocessor 16 receives the full-format command and controls all areas (e.g., the FAT area and the data area) contained in the storage unit 19 to be formatted. That is, in the full-format operation, the FAT information stored in the FAT area, the root-directory entry information, and the actual data stored in the data area are all deleted from the storage unit 19. Further, because all of the data is deleted from the storage unit 19 in the full-format operation, the time consumed for the full-format operation is longer than for formatting only the management area of the storage unit 19.

Figure 4:
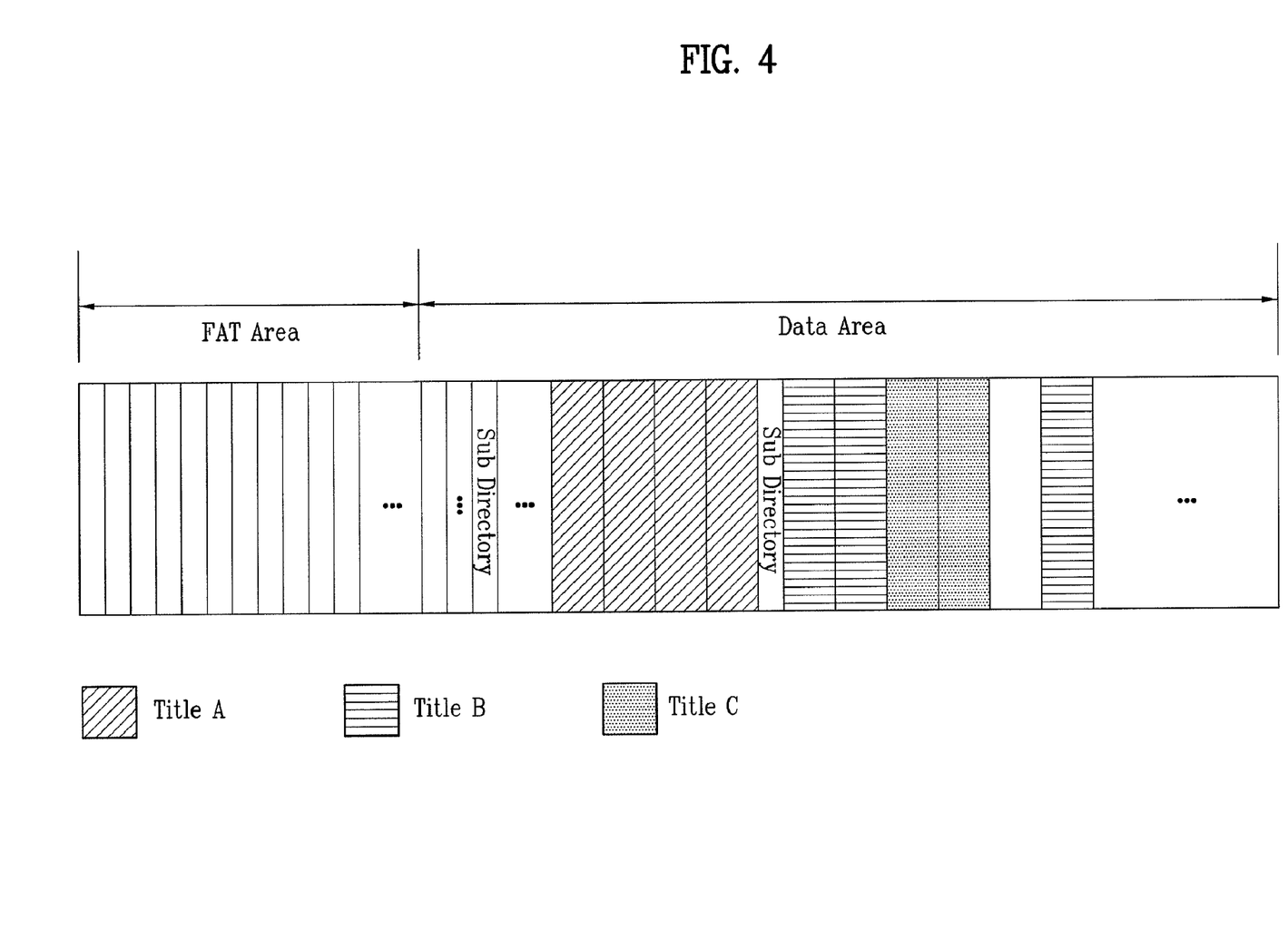
FIG. 4 is a conceptual diagram illustrating a quick format process of a storage unit according to an embodiment of the present invention.

Next, FIG. 4 is a conceptual diagram illustrating a quick format process of the storage unit 19 according to an embodiment of the present invention. As shown in FIG. 4, when the quick format is executed on the storage unit 19, all of the data is not deleted from the storage unit 19, and only the FAT information of actual data stored in the data area of the storage unit is initialized, so that the quick format is completed.

In more detail, when the controller 12 transmits a format command for formatting the storage unit 19 to the recording/reproducing unit via the interface unit 20, the microprocessor 16 receives the format command and formats the FAT area contained in the storage unit. That is, the FAT information stored in the FAT area is deleted from the storage unit. However, the data area is not formatted, so that data stored in the data area is not deleted.

In addition, while the storage unit 19 is formatted, the microprocessor 16 may format not only the FAT area, but also the root-directory entry area acting as a management area. Also, the data stored in the cluster including the root-directory entry is deleted from the storage unit 19.

Figure 5:
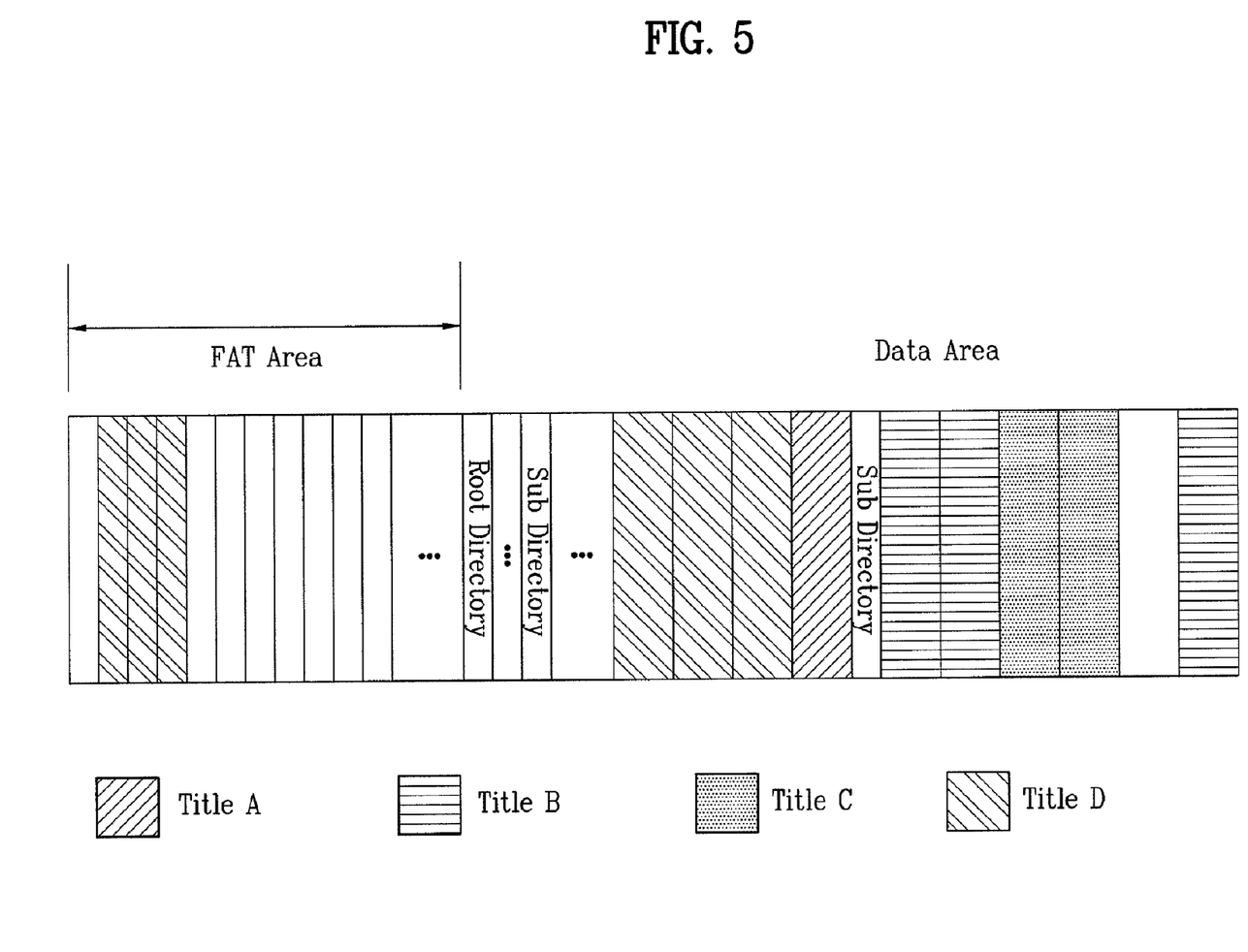
FIG. 5 is a conceptual diagram illustrating a method for adding data to the formatted storage unit according to an embodiment of the embodiment of FIG. 4.

Next, FIG. 5 is a conceptual diagram illustrating a method for adding data to the formatted storage unit 19 according to the embodiment of FIG. 4. As shown in FIG. 5, if a title D is added to the formatted storage unit 19, the files corresponding to the title D are recorded in the clusters including the title A's files. Further, the FAT information associated with the files is recorded in the formatted FAT area. In other words, new data is overwritten on old data of the data area. Information about the files and sub-directory entry associated with the title D is also recorded as the root-directory entry in the root-directory entry area.

Thus, when using the quick-format scheme, the storage unit 19 is formatted on the condition that not all of storage areas are deleted from the storage unit 19, so that the time consumed for the quick-format operation is shorter than the time consumed for the full-format operation.

Figure 6:
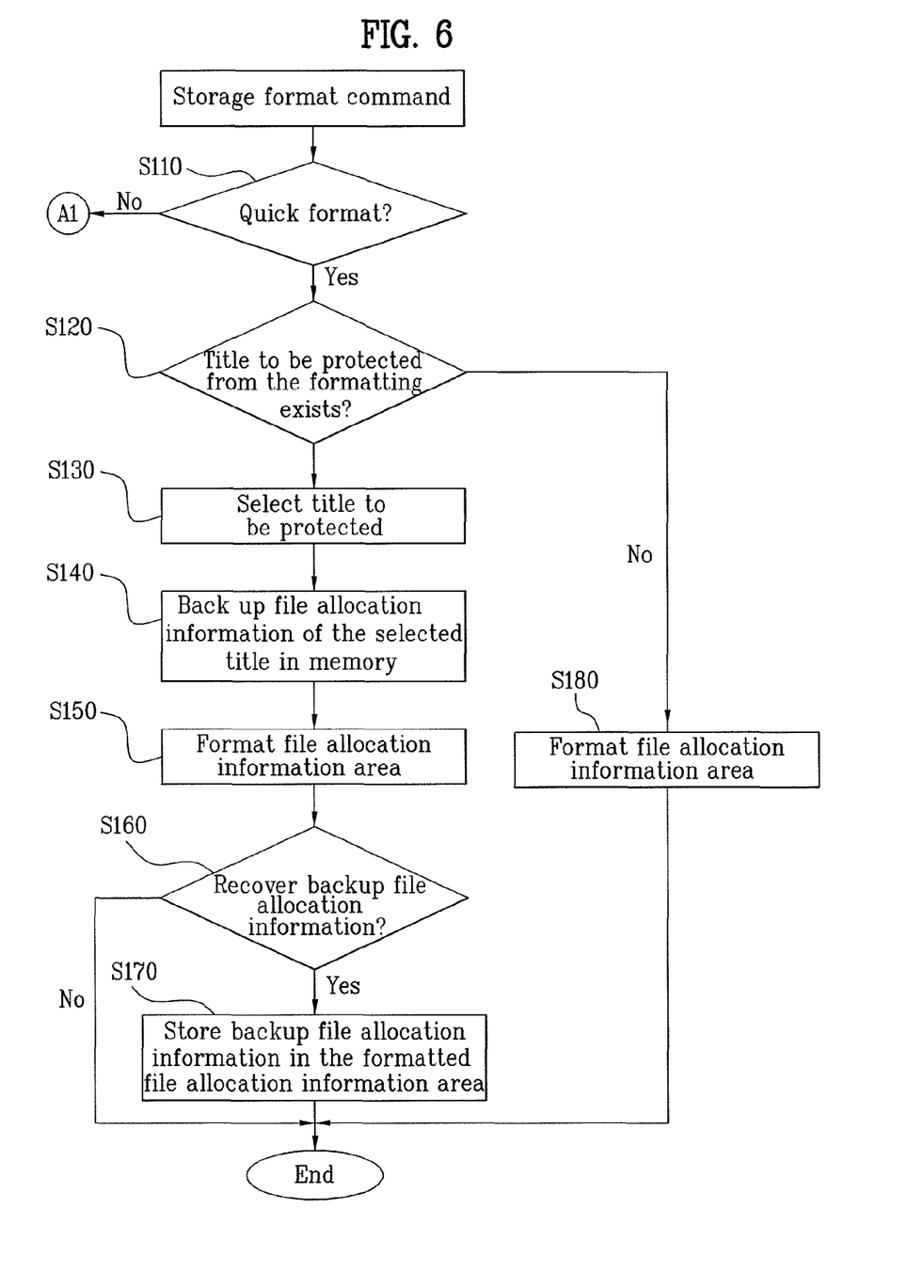
FIG. 6 is a flowchart illustrating a method for formatting a storage unit according to an embodiment of the present invention.
Figure 7:
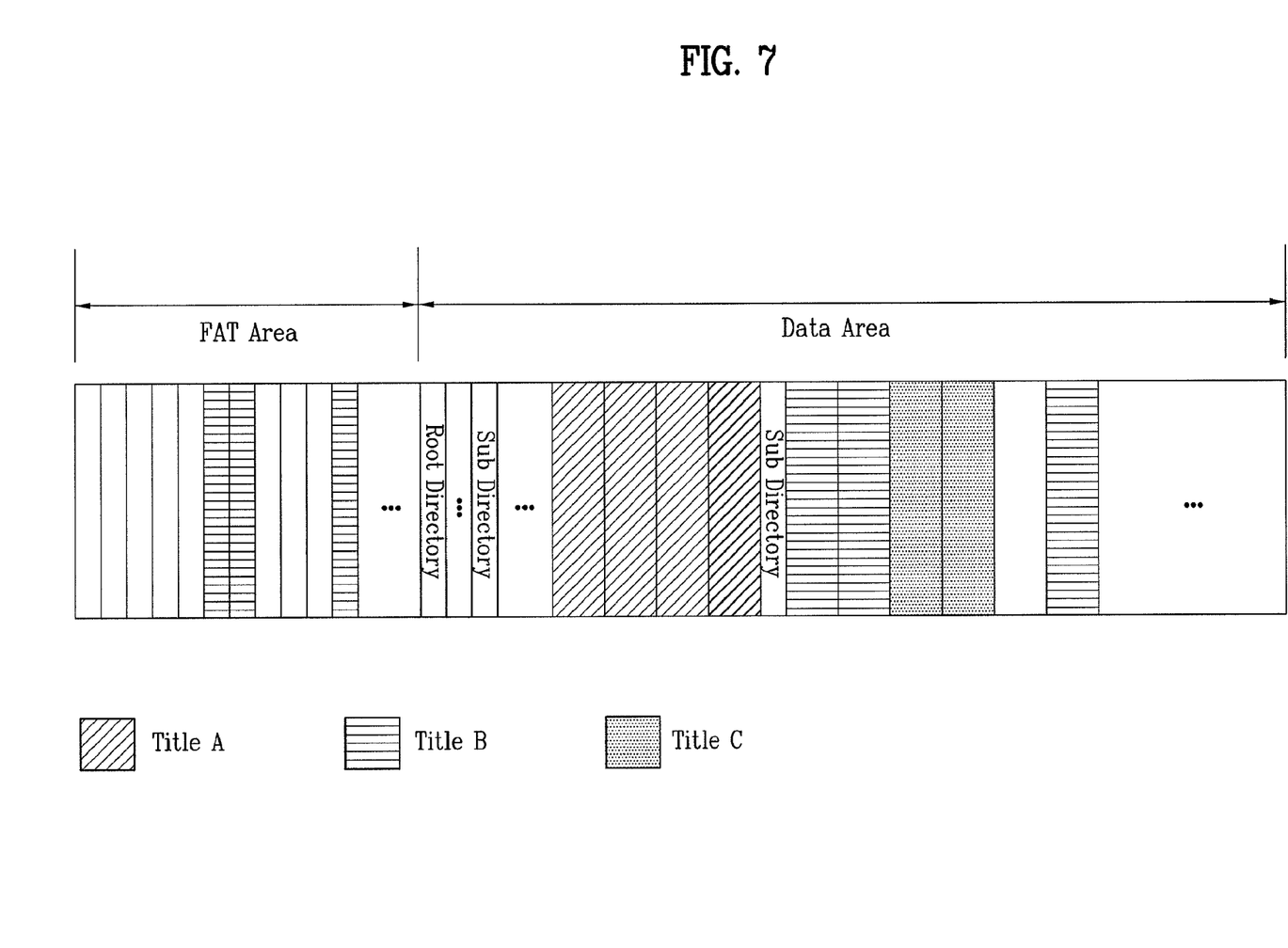
FIG. 7 is a conceptual diagram illustrating an inner area of the formatted storage unit according to an embodiment of the embodiment of FIG. 6.

Next, FIG. 6 is a flowchart illustrating a method for formatting the storage unit 19 according to an embodiment of the present invention, and FIG. 7 is a conceptual diagram illustrating an inner area of the formatted storage unit 19 according to an embodiment of the embodiment of FIG. 6.

The embodiments of FIGS. 6 and 7 protect desired or specific data from being formatted, so that the data can be reproduced by the data recording/reproducing device after formatting operation. In more detail, the controller 12 receives a format command from the user, and transmits the format command to the microprocessor 16 via the interface unit 20.

Figure 9:
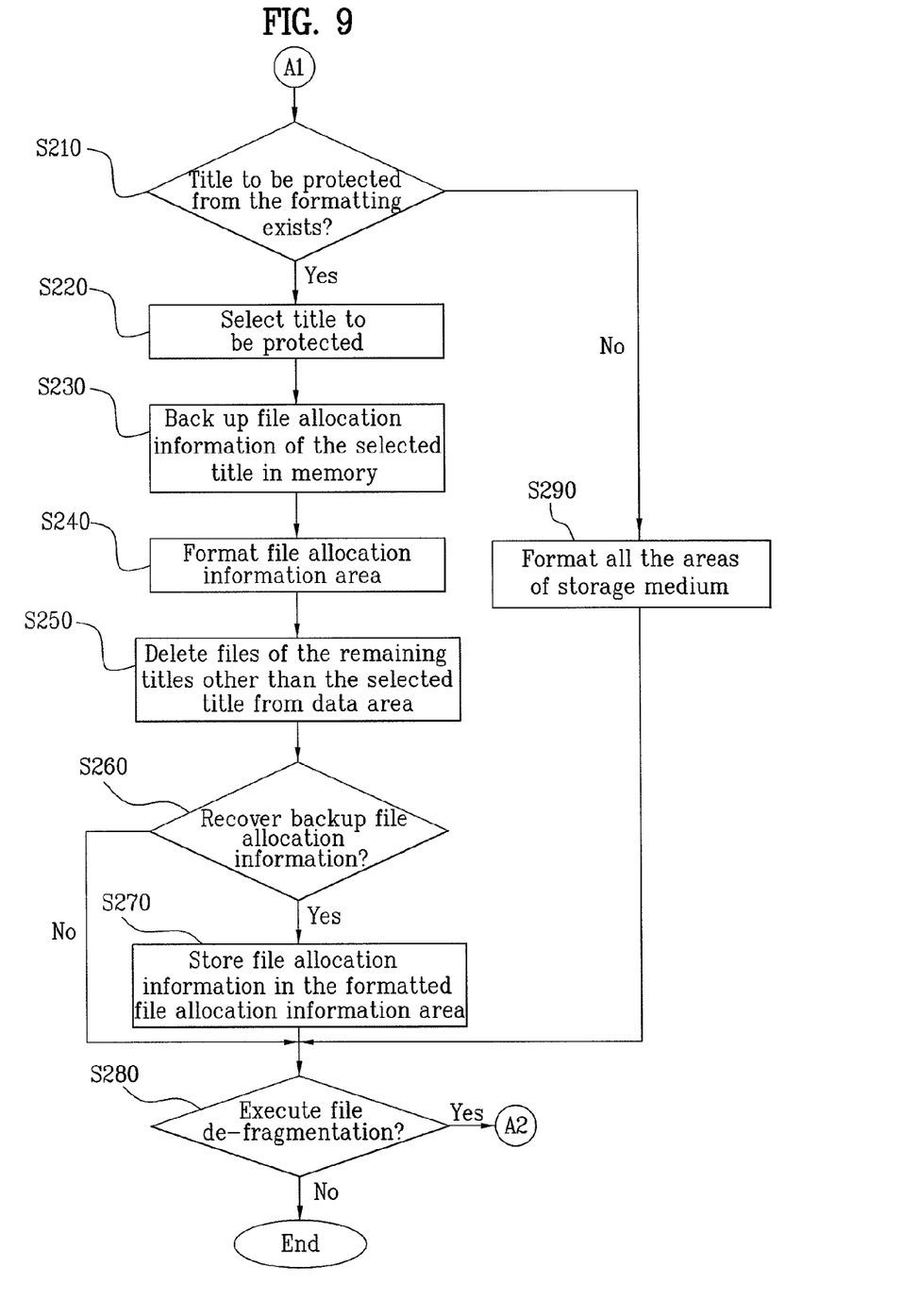
FIG. 9 is a flowchart illustrating a method for formatting a storage unit according to an embodiment of the present invention.

As shown in FIG. 6, the microprocessor 16 determines whether the format operation is a partial or full format operation (S110). If the format operation is a full format operation, the method shown in FIG. 9 is executed (i.e., the A1 process is executed). Otherwise, the controller 12 determines if any title exists that can be protected and then controls a user interface (UI) to be displayed on a display (not shown) connected to the data recording/reproducing device, so that the user can select a title (data) desired to be protected from among all titles recorded in the storage unit using the UI (S120).

Further, when there is no title to be protected at (No in step S120), the storage unit 19 is formatted using the quick-format method shown in FIG. 4 (S180). Otherwise, when user-desired title(s) to be protected exists (Yes in S120), the user may select a title to be protected using the above-mentioned UI (step S130). For example, if the user selects a title B in step S130, the controller 12 receives the user command via the UI and transmits the received command to the recording/reproducing unit via the interface unit 20. Upon receiving the above-mentioned command, the microprocessor 16 copies the FAT information associated with the selected title B and the sub-directory/file information associated with the title B from among the root-directory entry information, and stores the copied information in the memory 15 (step S140).

In other words, a variety of information (e.g., FAT and directory information) associated with the title B is backed up in the memory 15. Further, because the management information associated with the title B is contained in the data recording/reproducing device, this information may also be backed up on a built-in memory. However, the above-mentioned management information may also be backed up on an external memory detachably connected to the data recording/reproducing device.

Further, when the FAT associated with the title B is stored in the memory 15 at step S140, the microprocessor 16 formats and initializes the FAT area of the storage unit (step S150). Therefore, the old FAT stored in the FAT area is deleted from the storage unit 19.

In addition, the FAT area and the root-directory entry area may also be formatted during the above-mentioned formatting process. In this instance, all of the data stored in the root-directory entry associated with the titles A, B, and C is deleted from the storage unit 19. Also, when the root-directory entry is deleted, the data recording/reproducing device is unable to recognize the sub-directory associated with the titles A, B, and C and the file location, so that it is unable to reproduce the above-mentioned titles although the data of the titles A, B, and C has been left in the data area. Therefore, the information related to the title B is written back onto the storage unit 19.

In more detail, when the FAT area is completely formatted, the microprocessor 16 transmits a specific signal indicating that the FAT area has been completely formatted to the controller 12. Upon receiving this specific signal from the microprocessor 16, the controller 12 queries the user whether to recover the FAT information of the title B backed up on the memory 15 at the formatted FAT area (step S160). That is, the controller 12 controls the UI associated with the query to be displayed on the display, so that the user can recognize the query via the UI and input a desired command.

When the user desires to recover the above-mentioned backup FAT information (Yes in step S160), and as shown in FIG. 7, the FAT associated with the title B is stored in the formatted FAT area (step S170). Further, in order to reproduce the title B, the root-directory entry associated with the title B must also be stored in the storage unit 19. Therefore, the root-directory entry associated with the title B is added to the root-directory entry area.

In addition, when the root-directory entry area is formatted along with the FAT area, the data will be recorded in the initialized root-directory entry area. Otherwise, when the root-directory entry is not formatted along with the FAT area, the data is overwritten in the old root-directory entry area.

Further, the microprocessor 16 determines whether the format command received from the controller 12 is a quick-format command or a full-format command at step S110, and the decision about which category of the format command is decided may be changed according to implementations of the data recording/reproducing device.

Thus, the above-mentioned embodiments protect management information associated with a user-desired title to be preserved from being affected by the format process. Further, the backup process of the FAT information is not always required to preserve the FAT information of the title B, and other methods may be used. For example, the FAT information of the title B may be preserved deleting only FAT information of the titles A and C from the FAT area.

Figure 8:
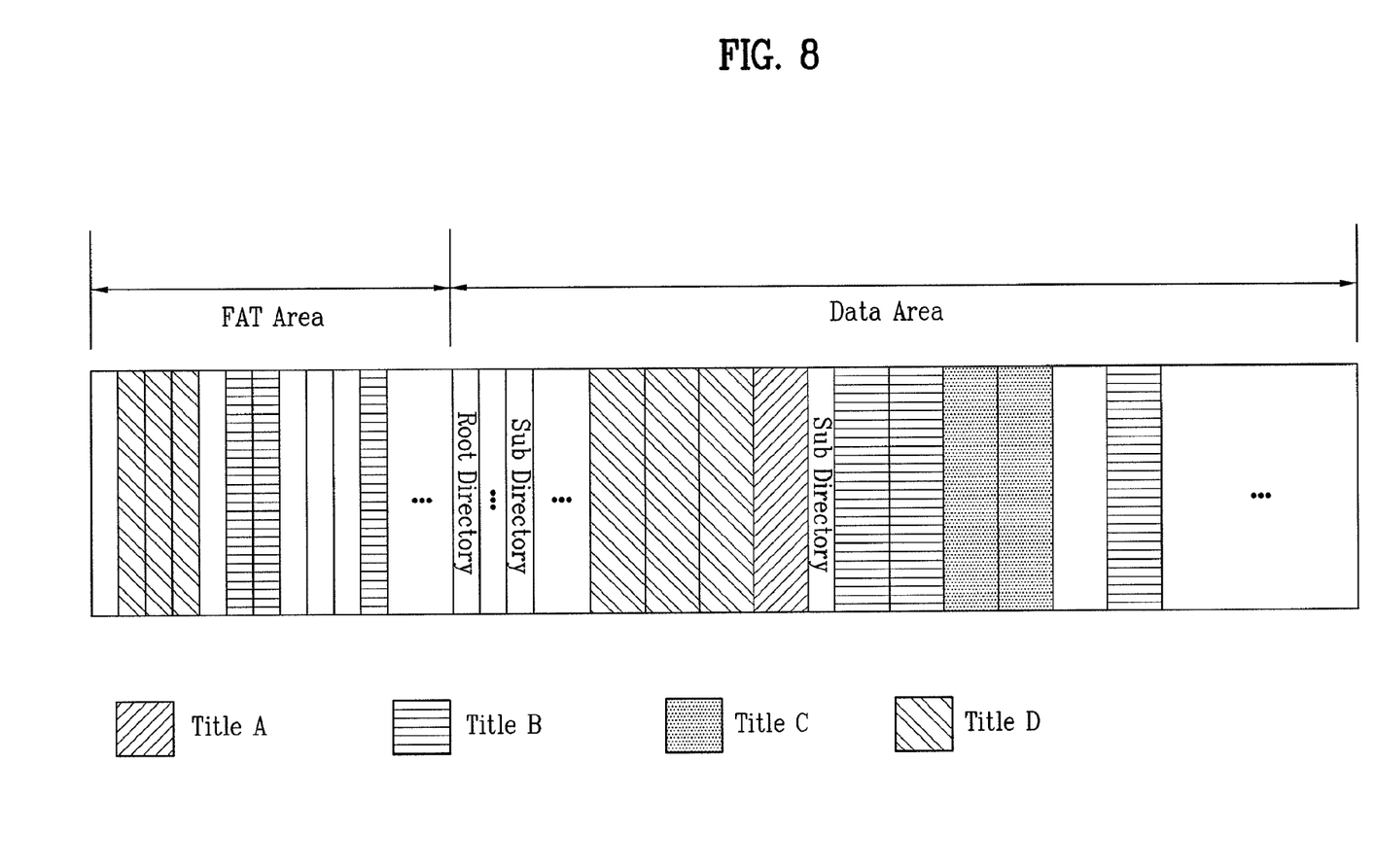
FIG. 8 is a conceptual diagram illustrating a method for adding data to the storage unit in FIG. 7 according to an embodiment of the present invention.

Next, FIG. 8 is a conceptual diagram illustrating a method for adding additional data to the storage unit 19 of FIG. 7 according to an embodiment of the present invention. Referring to FIG. 8, the FAT information of the title B is recovered in the FAT area of the storage unit 19, so that the microprocessor 16 can identify a plurality of clusters including files of the title B in the data area.

However, because the FAT area in FIG. 7 only includes the FAT information associated with the title B, the microprocessor 16 may determine that no data exists in the remaining clusters other than the clusters including the files of the title B. Therefore, if the user desires to add the title D to the storage unit 19 shown in FIG. 7, the microprocessor 16 checks the FAT information of the FAT area, and controls files of the title D to be stored in the remaining clusters other than clusters including the files of the title B. This is illustrated in FIG. 8.

Referring to FIG. 8, the microprocessor 16 determines that the clusters including the title A's files are empty based on the FAT of the FAT area, so that the microprocessor 16 controls the title D's files to be stored in the clusters including the title A's files. As a result, the title D's files are overwritten on the title A's files. Since the title D is added to the data area, the root-directory entry is updated so that it includes the sub-directory and file information of the title D.

Therefore, although the actual data of the titles A and C exists in the data area, the data recording/reproducing device is unable to reproduce the titles A and C, because the FAT information of the unselected titles A and C is deleted by the format process. Otherwise, the FAT information and actual data of the titles B and D are not deleted or damaged, so that they can be reproduced by the data recording/reproducing device. Thus, as shown in FIG. 8, the titles B and D may be reproduced after the quick format process.

Figure 10:
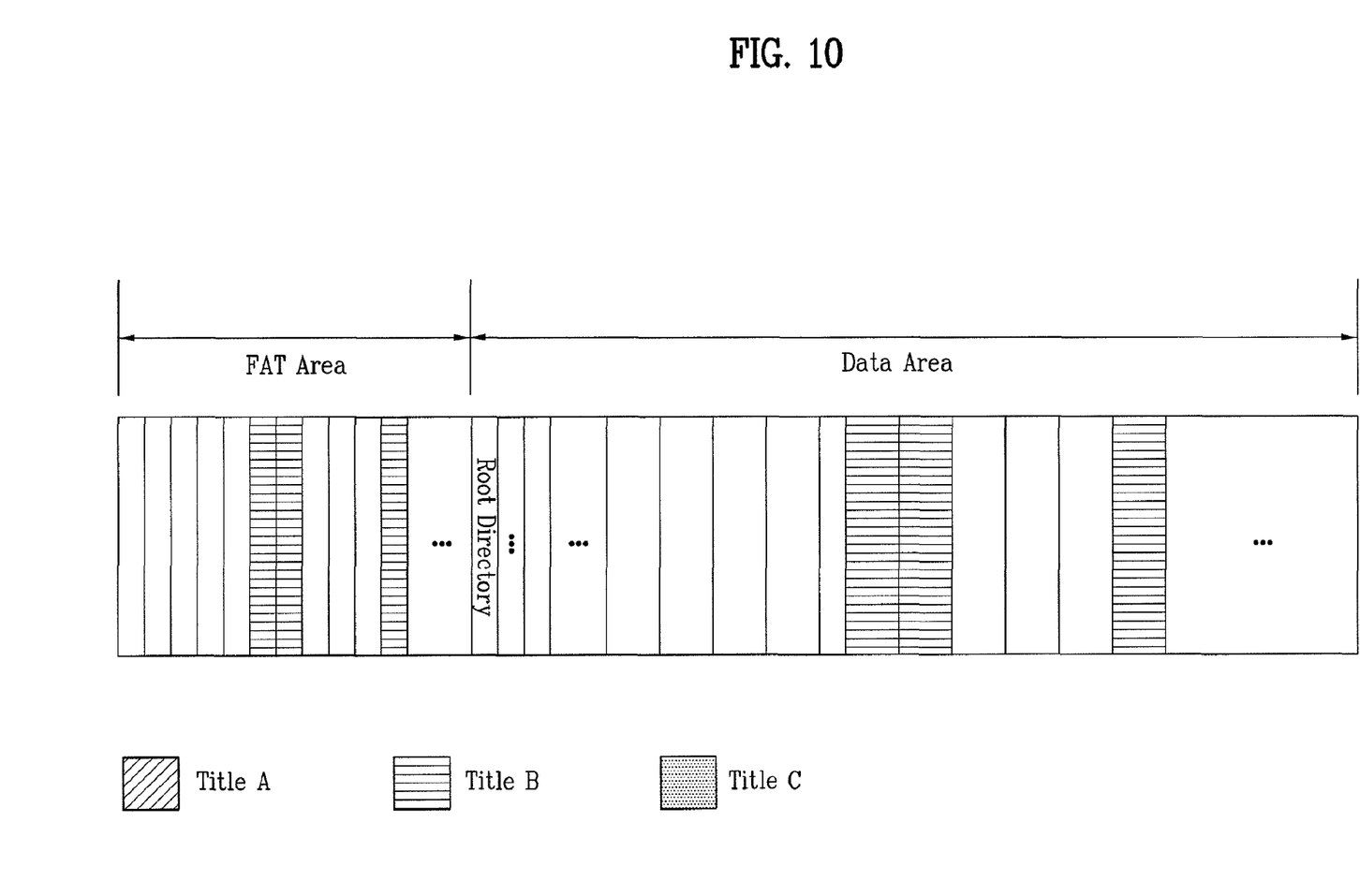
FIG. 10 is a conceptual diagram illustrating an inner area of the storage unit formatted by the method of FIG. 9 according to an embodiment of the present invention.

Next, FIG. 9 is a flowchart illustrating a method for formatting a storage unit according to another embodiment of the present invention, and FIG. 10 is a conceptual diagram illustrating an inner area of the storage unit formatted by the method of FIG. 9 according to the embodiment in FIG. 8.

In particular, the embodiments of FIGS. 9 and 10 delete not only management information but also actual data from the storage unit 19. In this embodiment, the controller 12 receives a format command from the user and determines the format command is a full format command (note this was determined in step S100 in FIG. 6).

Then, as shown in FIG. 9, the controller 12 determines if there is any title to be protected by the user (step S210). If no titles are to be protected (No in step S210), the storage unit 19 is formatted by the full-format method shown in FIG. 3 (step S290). Otherwise, when a user-desired title to be protected exists (Yes in step S210), the user selects a title to be protected using the above-mentioned UI (step S220).

For example, if the user selects a title B (i.e., Title B), the controller 12 receives the user command via the UI and transmits the received command to the recording/reproducing unit via the interface unit 20. Upon receiving the command, the microprocessor 16 copies or backups the FAT information associated with the selected title B and the sub-directory/file information associated with the title B from among the root-directory entry information to the memory 15 (step S230). In other words, a variety of information (e.g., FAT and directory information) associated with the title B is backed up on the memory 15.

Further, when the FAT associated with the title B is stored in the memory 15 at step S230, the microprocessor 16 controls the FAT area of the storage unit 19 to be formatted except for the user-desired title B in this example (step S240). Therefore, the files of the titles A and C are deleted from the data area. In addition, the data recording/reproducing device can easily search for the location at which the files of the titles A and C are stored, by referring to the backup FAT.

Further, the FAT area and the root-directory entry area may also be formatted during the above-mentioned format process. In this instance, all of the root-directory entries associated with the titles A, B, and C are deleted from the storage unit 19. If the root-directory entries are removed from the storage unit 19, the data recording/reproducing device is unable to recognize the sub-directories and files associated with the titles A, B, and C.

Also, when the FAT area is completely formatted and the files of the titles A and C are deleted, the microprocessor 16 transmits a specific signal indicating the completion of the storage format to the controller 12. Upon receiving the specific signal from the microprocessor 16, the controller 12 queries the user whether to recover the FAT information of the title B backed up on the memory 15 at the formatted FAT area (step S260). In this instance, the controller 12 displays the UI associated with the query on the display, so that the user can recognize the query via the UI.

If the user desires to recover the above-mentioned backup FAT information (Yes in S260), and as shown in FIG. 10, the FAT associated with the title B is stored in the formatted FAT area (step S270). Further, in order to reproduce the title B, the root-directory entry associated with the title B must also be stored in the storage unit 19. Therefore, the root-directory entry associated with the title B is added to the root-directory entry area.

If the root-directory entry area is formatted along with the FAT area, data will be recorded in the initialized root-directory entry area. Otherwise, if the root-directory entry is not formatted along with the FAT area, data is overwritten in the old root-directory entry area.

In addition, the order of the above-mentioned steps S230 (i.e., backup of management information of the title B), S240

(i.e., formatting of the management area), S250 (i.e., deletion of unselected files) and S270 (i.e., backup management information) is variable and can be changed.

Further, during a repeated recording and deleting process, the files of the title B may be scattered in the data area. In other words, the repeated data recording and deleting in the data area may result in fragmentation of the title B. Therefore, the microprocessor 16 prompts the user to determine if they want to collect or de-fragment the files (step S280). When the user wants to de-fragment the data (Yes in S280), the microprocessor 16 controls the title B's files scattered in the data area to be de-fragmented or (collected) at step A2, so that the title B's files are stored in continuous clusters.

Further, the de-fragmentation process collects the files such that the data area is effectively used and data stored in the data area is effectively reproduced. The de-fragmentation process in A2 is shown in detail in FIGS. 11 and 12.

Figure 11:
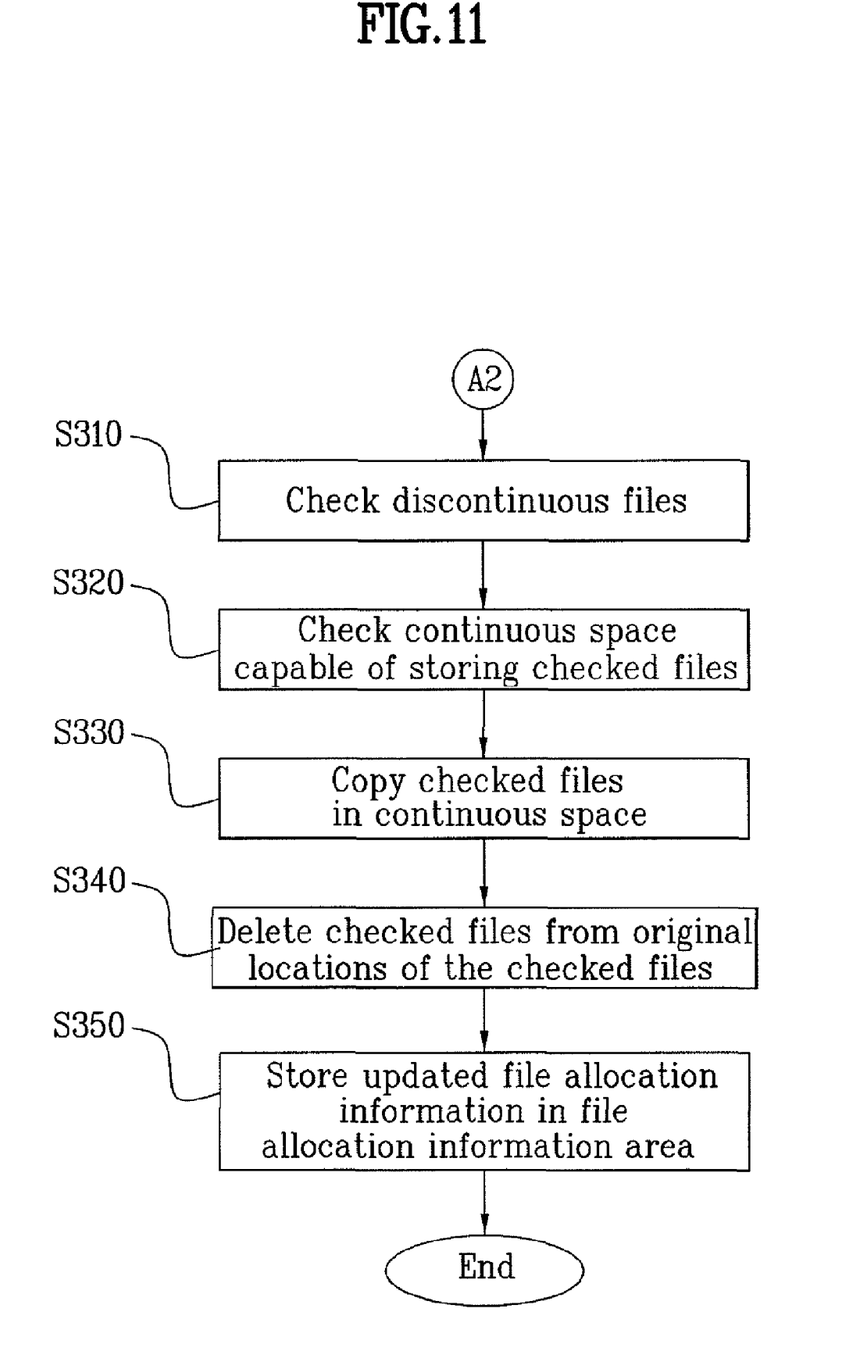
FIG. 11 is a flowchart illustrating a method for de-fragmentating pieces of data according to an embodiment of the present invention.
Figure 12:
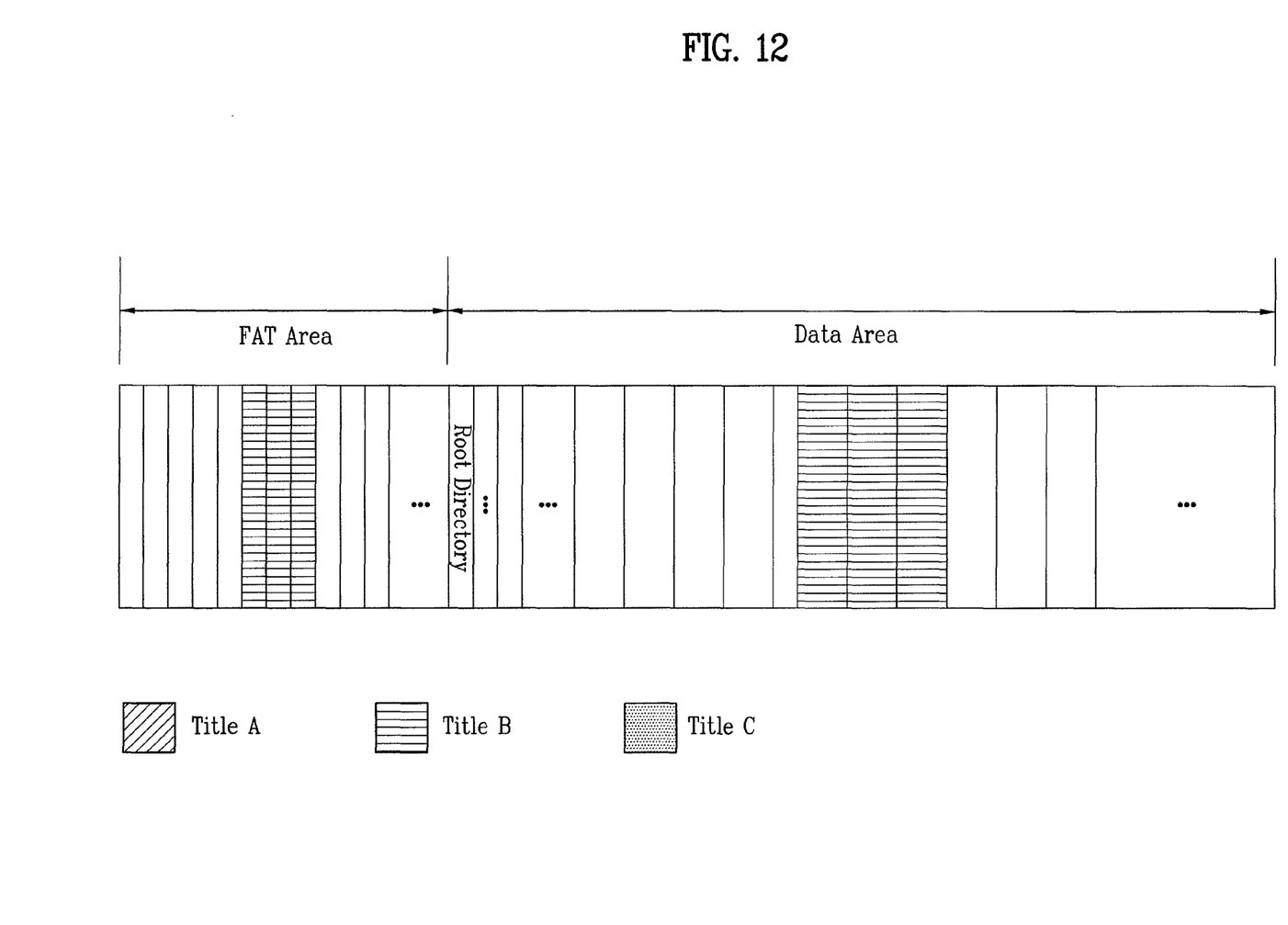
FIG. 12 is a conceptual diagram illustrating an inner area of the storage unit in which de-fragmentation has been performed.

In more detail, FIG. 11 is a flowchart illustrating a method for performing a de-fragmentation process according to an embodiment of the present invention, and FIG. 12 is a conceptual diagram illustrating an inner area of the storage unit in which the de-fragmentation process has been performed.

As shown in FIG. 11, the microprocessor 16 checks the title B recorded in discontinuous areas to perform the piece collection process (step S310). Further, the microprocessor 16 guarantees or checks a continuous space capable of collecting the title B in the data area (step S320), and when the continuous space is guaranteed, the microprocessor 16 controls the scattered files of the title B in the continuous space to be copied (step S330), and deletes the aforementioned files existing at the original locations (S340).

In addition, the microprocessor 16 updates the management information of the title B stored in the continuous space, and stores the updated management information in the management area (step S350). Further, the microprocessor 16 may also perform the de-fragmentation process as a background process when the data recording/reproducing device is reproducing data or is in an idle status.

Further, the embodiments of FIGS. 6-8 and the FIGS. 9-12 may be combined with each other, or may also be performed in either order. For example, upon receipt of the format command of the storage unit 19, the microprocessor 16 controls the management information of a title to be protected to be preserved, and formats the management area of the storage unit 19.

In addition, when the data recording/reproducing device is in an idle mode, the microprocessor 16 may delete actual data of the remaining titles other than the above-mentioned protected title from the management area of the storage unit 19, and may perform a de-fragmentation process of the actual data of the remaining titles.

In addition, the recording medium for use in the present invention includes all recordable mediums, for example, an optical disc, and a magnetic tape, etc., according to various recording schemes. Further, although the storage unit or medium including data is formatted, the present invention can protect user-desired data to be preserved from formatting of the storage medium.

As apparent from the above description, although the storage medium including data is formatted, embodiments of the present invention protect user-desired data to be preserved from being formatted.

If the user desires to delete the remaining data other than a specific title from the storage medium, the present invention initializes the storage medium simultaneously while leaving only the specific title in the storage medium, so that the user need not manually select each of the remaining data desired to be deleted, resulting in greater convenience of the user. In this way, the user can freely and easily empty the storage unit.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for formatting a storage medium included in an apparatus, the method comprising:
   saving management information associated with data that is to be protected from the formatting, the management information indicating where the data to be protected is stored and being originally stored on the storage medium and saved to a memory that is different than the storage medium;
   formatting a management information area of the storage medium where the management information is stored; and
   recovering the saved management information to the management information area of the storage medium such that the data to be protected is accessible,
   wherein the formatting step only formats the management information area and does not format a data area including the stored data that is to be protected from the formatting.

2. The method of claim 1, wherein the memory is detachably connected to the storage medium.

3. The method of claim 1, wherein the formatting step skips over the formatting of the data area using the saved management information by reading a starting and ending address of where the data to be protected is located, and skipping over a portion of the data area beginning at the starting address and ending at the ending address.

4. The method of claim 1, further comprising:
   providing a user interface to select the data to be protected.

5. The method of claim 1, further comprising:
   providing a user interface including a quick and a full formatting mode,
   wherein the full formatting mode corresponds to the formatting step formatting the data area of the storage medium that includes data but skipping over formatting of the data area including the stored data that is to be protected and formatting the management information area, and the quick formatting mode corresponds to the formatting step only formatting the management information area.

6. The method of claim 1, further comprising:
   de-fragmenting the data to be protected so that the data to be protected is successively located in the data area of the storage medium.

7. The method of claim 6, further comprising:
   providing a user interface for selecting whether or not to perform the de-fragmenting step.

8. The method of claim 1, wherein the management information includes a file allocation table (FAT) of the data to be protected or directory/file information of the data to be protected.

9. The method of claim 1, further comprising:
   receiving a selection signal indicating a selection of at least one title among a plurality of titles that are stored on the storage medium, said selected at least one title corresponding to the data that is to be protected, wherein the saving step only saves management information associated with the selected at least one title and does not save management information for other titles of the plurality of titles.

10. The method of claim 9, further comprising:
receiving a selection signal indicating a request for adding a title that is not included in plurality of titles that are stored on the storage medium;
updating the management information on the storage medium for said title to be added; and
writing said title to be added on the data area over at least one title among the plurality of titles that is not protected.

11. An apparatus for formatting a storage medium, the apparatus comprising:
a memory configured to save management information associated with data that is to be protected from the formatting, the management information indicating where the data to be protected is stored and being originally stored on the storage medium of the apparatus and saved to the memory that is different than the storage medium; and
a controller configured to format a management information area of the storage medium where the management information is stored, and to recover the saved management information to the management information area of the storage medium such that the data to be protected is accessible,
wherein the controller is further configured to only format the management information area and not to format a data area including the stored data that is to be protected from the formatting of the storage medium.

12. The apparatus of claim 11, wherein the memory is detachably connected to the storage medium.

13. The apparatus of claim 11, wherein the controller is further configured to skip over formatting the data area using the saved management information by reading a starting and ending address of where the data to be protected is located, and to skip over a portion of the data area beginning at the starting address and ending at the ending address.

14. The apparatus of claim 11, wherein the controller is further configured to provide a user interface to select the data to be protected.

15. The apparatus of claim 11, wherein the controller is further configured to provide a user interface including a quick and a full formatting mode, and
wherein the full formatting mode corresponds to the controller formatting the data area of the storage medium that includes data but skipping over formatting of the data area including the stored data that is to be protected and formatting the management information area, and the quick formatting mode corresponds to the controller only formatting the management information area.

16. The apparatus of claim 11, wherein the controller is further configured to de-fragment the data to be protected so that the data to be protected is successively located in the data area of the storage medium.

17. The apparatus of claim 16, wherein the controller is further configured to provide a user interface for selecting whether or not to perform the de-fragmenting step.

18. The apparatus of claim 11, wherein the management information includes a file allocation table (FAT) of the data to be protected or directory/file information of the data to be protected.

19. The apparatus of claim 11, wherein the controller is further configured to receive a selection signal indicating a selection of at least one title among a plurality of titles that are stored on the storage medium, said selected at least one title corresponding to the data that is to be protected, and to only save management information associated with the selected at least one title and not save management information for other titles of the plurality of titles.

20. The apparatus of claim 19, wherein the controller is further configured to receive a selection signal indicating a request for adding a title that is not included in plurality of titles that are stored on the storage medium, to update the management information on the storage medium for said title to be added, and to write said title to be added on the data area over at least one title among the plurality of titles that is not protected.

21. A computer program embodied on a tangible medium and including computer program instructions, that when executed cause a processor of a computer to perform:
saving management information associated with data that is to be protected from formatting, the management information indicating where the data to be protected is stored and being originally stored on a storage medium of the computer and saved to a memory that is different than the storage medium;
formatting a management information area of the storage medium where the management information is stored; and
recovering the saved management information to the management information area of the storage medium such that the data to be protected is accessible,
wherein the formatting step only formats the management information area and does not format a data area including the stored data that is to be protected from the formatting step.

22. The computer program of claim 21, wherein the memory including the management information is detachably attached to the computer.

23. The computer program of claim 21, wherein the computer program instructions, that when executed cause the processor of the computer to further perform:
receiving a selection signal indicating a selection of at least one title among a plurality of titles that are stored on the storage medium, said selected at least one title corresponding to the data that is to be protected,
wherein the saving step only saves management information associated with the selected at least one title and does not save management information for other titles of the plurality of titles.

24. The computer program of claim 23, wherein the computer program instructions, that when executed cause the processor of the computer to further perform:
receiving a selection signal indicating a request for adding a title that is not included in plurality of titles that are stored on the storage medium;
updating the management information on the storage medium for said title to be added; and
writing said title to be added on the data area over at least one title among the plurality of titles that is not protected.

* * * * *